US006965620B2

(12) United States Patent
Spiegelberg et al.

(10) Patent No.: US 6,965,620 B2
(45) Date of Patent: Nov. 15, 2005

(54) ERBIUM-DOPED PHOSPHATE-GLASS TUNABLE SINGLE-MODE FIBER LASER USING A TUNABLE FABRY-PEROT FILTER

(75) Inventors: Christine P. Spiegelberg, Tucson, AZ (US); Jihong Geng, Tucson, AZ (US); Yushi Kaneda, Tucson, AZ (US); Shibin Jiang, Tucson, AZ (US); Ronald Pollock, Van Nuys, CA (US); Ik Joon Song, Montebello, CA (US); Ping Li, Diamond Bar, CA (US); Sean Staines, Hampshire (GB); Chih-Jen Chi, Thousand Oaks, CA (US)

(73) Assignee: NP Photonics, Inc., Tucson, AZ (US)

( * ) Notice: Subject to any disclaimer, the term of this patent is extended or adjusted under 35 U.S.C. 154(b) by 24 days.

(21) Appl. No.: 10/384,813

(22) Filed: Mar. 10, 2003

(65) Prior Publication Data

US 2004/0196874 A1 Oct. 7, 2004

Related U.S. Application Data

(63) Continuation of application No. 10/056,830, filed on Jan. 24, 2002, now Pat. No. 6,816,514.

(51) Int. Cl.[7] .................................................. H01S 3/00
(52) U.S. Cl. .............................. 372/6; 372/92; 372/99; 372/102
(58) Field of Search ............................ 372/6, 99, 102

(56) References Cited

U.S. PATENT DOCUMENTS

| 5,425,039 | A | | 6/1995 | Hsu et al. |
| 6,137,812 | A | | 10/2000 | Hsu et al. |
| 6,426,830 | B1 | * | 7/2002 | Robinson ..................... 359/308 |
| 6,738,186 | B2 | * | 5/2004 | Jiang et al. ............... 359/341.5 |
| 2003/0072009 | A1 | * | 4/2003 | Domash et al. ............. 356/519 |

FOREIGN PATENT DOCUMENTS

WO    WO 02/075872 A1    9/2002

OTHER PUBLICATIONS

Kevin Hsu et al., Single–mode tunable erbium:ytterbium fiber Fabry–Perot microlaser, Optics Letters, Jun. 15, 1994, vol. 19, No. 12, pp. 886–888.

Ed Miskovic, Wavelength Lockers Keep Lasers in Line, Photonics Spectra, Feb. 1999, pp. 104–108.

Erlend Ronnekleiv, Frequency and Intensity Noise of Single Frequency Fiber Bragg Grating Lasers, Optical Fiber Technology, 2001, 7, pp. 206–235.

(Continued)

*Primary Examiner*—Minsun Oh Harvey
*Assistant Examiner*—Dung Nguyen
(74) *Attorney, Agent, or Firm*—Eric A. Gifford

(57) ABSTRACT

A short laser cavity (up to 30 cm in length) comprising a free-space tunable MEMS Fabry-Perot filter, a collimating lens and a section of erbium-doped phosphate gain fiber (2–25 cm) is formed between a pair of broadband reflectors. The cavity is optically pumped to excite the erbium ions and provide gain, which establishes an initial longitudinal mode structure that spans the C-band with a mode spacing of at least 0.3 GHz and a roundtrip unsaturated gain of at least 8 dB over the tuning range. A controller tunes the MEMS filter, which has a filter function whose spectral width is at most ten and preferably less than four times the longitudinal mode spacing, to align its transmission maxima to one of a plurality of discrete output wavelengths that span the C-band. A thermal control element adjusts the longitudinal mode structure to align a single mode with the transmission maxima of the filter. Because the spectral width of the filter function is narrow, laser emission will be limited to a single longitudinal mode.

31 Claims, 13 Drawing Sheets

OTHER PUBLICATIONS

W.H. Loh et al., High Performance Single Frequency Fiber Grating–Based Erbium:Ytterbium –Codoped Fiber Lasers, Journal of Lightwave Technology, 1998, vol. 16, No. 1, pp. 114–118.

David L. Veasey et al., Arrays of distributed–Bragg–reflector waveguide lasers at 1536 nm in Yb/Er codoped phosphate glass, Applied Physics Letters, Feb. 8, 1999, vol. 74, No. 6, pp. 789–791.

Kevin Hsu et al., Continuous and discrete wavelength tuning in Er:Yb fiber Fabry–Perot laser, Optics Letters, Feb. 15, 1995, vol. 20, No. 4, pp. 377–379.

Todd Haber et al., Tunable Erbium–Doped Fiber Ring Laser Precisely Locked to the 50–GHz ITU Frequency Grid, IEEE Photonics Technology Letters, Nov. 2000, vol. 12, No. 11, pp. 1456–1458.

* cited by examiner

ERBIUM-DOPED PHOSPHATE-GLASS TUNABLE SINGLE-MODE FIBER LASER USING A TUNABLE FABRY-PEROT FILTER

CROSS-REFERENCE TO RELATED APPLICATIONS

This application claims benefit of priority under 35 U.S.C. 120 to and is a continuation of U.S. application Ser. No. 10/056,830 entitled "Rare-Earth Doped Phosphate-Glass Single-Mode Fiber Lasers" filed on Jan. 24, 2002 now U.S. Pat. No. 6,816,514 and of foreign application of PCT Patent Application No. PCT/US02/12496 entitled "MEMS-Based Tunable Fabry-Perot Filters and Method of Forming Same" filed on Apr. 22, 2002, the entire contents of which are incorporated by reference.

BACKGROUND OF THE INVENTION

1. Field of the Invention

This invention relates to fiber lasers and more specifically to a tunable single-mode fiber laser using a MEMS Fabry-Perot filter that provides higher optical output powers and enhanced mode selectivity and stability.

2. Description of the Related Art

Rare-earth doped optical waveguides such as fibers or planar waveguides are used in amplifiers and lasers for telecommunications because they provide high optical gain over a broad spectral range. In the simplest laser geometry, a gain medium is placed in a cavity defined by two reflectors. The cavity has periodically spaced longitudinal modes with a frequency spacing $\Delta v$ given by:

$$\Delta v = \frac{c}{2nd} \quad (1)$$

where n the refractive index of the gain medium, c the vacuum velocity of light, and d the length of the cavity. The laser only oscillates at a frequency (or frequencies) that coincides with one (or several) of these cavity modes. Which one and how many modes reach threshold depends on the details of the gain medium. In the ideal case of a purely homogeneously broadened system only the mode that is closest to the gain maximum will oscillate and saturate the optical gain, i.e. pin the gain to the value that is necessary to reach the lasing threshold for this one mode. Even though rare earth doped glasses at elevated temperature are often considered to be dominantly homogenously broadened, inhomogeneous broadening is an important factor in these materials and for closely spaced longitudinal cavity modes, many lasing modes will oscillate.

To achieve single-mode operation, the active cavity length can be reduced so that the mode spacing exceeds the gain bandwidth. Since this approach limits the cavity length to a few hundred micrometers, the output power of such a laser is very small and typically tens of microwatts. [K. Hsu, C. M. Miller, J. T. Kringlebotn, E. M. Taylor, J. Townsend, and D. N. Payne, "Single-mode tunable erbium:ytterbium fiber Fabry-Perot microlaser", Optics Letters, 19, 886 (1994), K. Hsu, C. M. Miller, J. T. Kringlebotn, and D. N. Payne, "Continuous and discrete wavelength tuning in Er:Yb fiber Fabry-Perot lasers" Optics Letters 20, 377 (1995)] With the development of waveguide/fiber Bragg gratings, at least one of the broad band reflectors can be replaced with a compact wavelength selective fiber Bragg grating, which provides feedback over a spectral width that is much narrower than that of the gain medium. With a typical spectral bandwidth of these reflectors of about 0.1–0.2 nm, active cavities as long as a few centimeters with output power of several tens of milliwatts have been demonstrated [W. H. Loh, B. N. Samson, L. Dong, G. J. Cowle, and K. Hsu, "High Performance Single Frequency Fiber Grating-Based Erbium:Ytterbium-Codoped Fiber Lasers", Journal of Lightwave Technology, Vol. 16, No. 1, p. 114 (1998), D. L. Veasey, D. S. Funk, N. A. Sanford, and J. S. Hayden, "Arrays of distributed-Bragg-reflector waveguide lasers at 1536 nm in Yb/Er codoped phosphate glass", Applied Physics Letters, Vol. 74, No. 6, p. 789 (1999)]. Longer cavities could provide even higher power output but also lead to a large number of longitudinal cavity modes inside the selected wavelength band and therefore to multimode operation of the laser.

Limited wavelength tunability can be achieved by controlling the temperature or length of the fiber Bragg grating to shift the spectral position of the reflection peak. Owing to the very small temperature dependence of the glass, the thermal tuning range of these lasers is on the order of a few nanometers only. Strain or compression tuning of specially designed fiber Bragg grating can result in larger tuning ranges. However, this kind of tuning is typically done using piezoelectric transducers and the effects of creep and hysteresis limit the wavelength reproducibility and so far have prevented the practical implementation of these lasers. Distributed feedback lasers also demonstrated single frequency operation with a high degree of side mode suppression. Due to the fixed grating, wavelength tunability of these lasers is, however, problematic as well.

Coupled cavity lasers, in which an external cavity (active or passive) is coupled to an active laser cavity, have the potential of combining mode selectivity with the possibility of wavelength tuning. The external cavity acts as a periodic wavelength dependent mirror providing minimum cavity loss only for certain longitudinal modes of the active laser cavity. The performance of such lasers depends on the relative optical length of the cavities where the distinction can be made between long-long and long-short cavity assemblies. In the case of a long-short coupled cavity, one cavity is short enough so that its mode spacing is large compared to the spectral width of the gain profile. All but the mode that is inside the gain profile of the active medium is suppressed. To tune the wavelength of such a laser over a region comparable to the spectral width of the gain spectrum, the optical length of the short cavity has to be changed considerably. An example of such a short external cavity fiber laser is given in U.S. Pat. Nos. 6,137,812 and 5,425,039. By placing a fiber assembly into fiber ferrule alignment fixtures, the length of a short air gap can be changed by piezoelectric means. Long-long cavities, on the other hand, have the advantage that only small changes in the optical path of either cavity are needed to obtain a broad tuning range. This effect is called the Vernier effect. In addition to that, long-long cavities are able to provide larger output powers. The major drawback of known long-long devices has been mode stability.

Ring lasers also have the potential of combining mode selectivity with the possibility of wavelength tuning and high output power levels (see "Tunable Erbium-Doped Fiber Ring Laser Precisely Locked to the 50-GHz ITU Frequency Grid", Todd Haber, Kevin Hsu, Calvin Miller, and Yufei Bao, IEEE Photonics Technology Letters, Vol. 12, No 11, November 2000). The operation of ring lasers requires the use of additional optical components such as isolators, polarization controllers, wavelength division multiplexing (WDM) filters, and polarizers. To account for the insertion losses of these components, ring lasers typically require an active fiber length of at least 10 meters, and an overall fiber length of 15–20 meters. Haber mentions "To enable continuous single-frequency tuning operation of such a laser across a typical EDFA spectral width of 50 nm, a tunable filter of wide tuning range (>50 nm), narrow bandwidth (<1 GHz), and low loss (<3 dB) would be desirable. Unfortunately, no practical commercial filter at present can meet such stringent requirements . . . " Instead, Haber cascades a fiber Fabry-Perot interferometer (FFPI) with a fiber Fabry-Perot tunable filter (FFP-TF). The FFP-TF selects one of the transmission peaks of the FFPI while the FFPI selects a single longitudinal frequency mode of the ring laser. The length of the active fiber, supports high output power levels but makes mode-stability difficult. That is apparent from Haber, where, even though the laser presented was operating at a single frequency and one polarization only, mode-hop free operation was observed for only 21 min at a time.

What is needed for most telecom applications is a high-power tunable single-mode laser, more particularly, a tunable laser that can function at power levels of 20 to 50 mW and provide stable single-mode operation over the C-band (1530–1565 nm) with rapid wavelength scanning over that band.

SUMMARY OF THE INVENTION

In view of the above problems, the present invention provides a tunable single-mode fiber laser with output powers in excess of 50 mW over the C-band (1530 nm–1565 nm) with enhanced mode selectivity and stability.

A short laser cavity (up to 30 cm in length) comprising a free-space tunable Fabry-Perot filter, one or two collimating lenses and a section of erbium-doped phosphate gain fiber (2–25 cm) is formed between a pair of broadband reflectors. The cavity is optically pumped to excite the erbium ions and provide gain, which establishes an initial longitudinal mode structure that spans the telecommunication C-band with cavity mode spacing of at least 0.3 GHz and a roundtrip unsaturated gain of at least 8 dB over the tuning range. A controller tunes the narrow-band Fabry-Perot filter to the desired wavelength. A temperature controller adjusts the longitudinal mode structure to align a single cavity mode with the transmission maximum of the filter. Because the spectral width of the filter function is narrow, at most ten and preferably less than four times the longitudinal mode spacing, laser emission will be limited to a single longitudinal mode. Although the gain fiber is inherently more stable than semiconductor lasers and can operate open-loop, a λ-locker, placed outside the laser cavity, can be used to establish a periodic filter function having transmission maxima that fix the discrete output wavelengths and lock the mode structure to the output wavelength to ensure stable single-mode performance.

A key to achieving stable single-mode operation over the C-band with output powers in excess of 50 mW is the erbium-doped phosphate gain fiber. The fiber is drawn from a phosphate glass preform that is doped with 0.5–5.0 wt. % and preferably 1–3 wt. % erbium ions to form a highly doped core surrounded by a phosphate cladding. In some instances the glass may be further doped with ytterbium; 0.5–5 wt. % (single-mode core pumped) or 5–20 wt. % ytterbium ions (multi-mode clad pumped). Initial experiments have demonstrated that this class of phosphate glass supports continuous single-mode lasing without self-pulsation at the high doping concentrations required to provide sufficient gain in the short cavity lengths necessary to support high power single-mode lasers.

A key to achieving stable single-mode operation over the C-band with enhanced mode selectivity is the performance of the tunable Fabry-Perot filter. The filter must provide a free spectral range (FSR) that exceeds the tuning range, a narrow linewidth at most ten and preferably less than four times the longitudinal mode spacing, and a stable peak tunable.

In one embodiment, a tunable MEMS Fabry-Perot filter includes a first mirror supported by a mirror support, a second mirror supported by a compliant mechanism, and an actuator support. The compliant mechanism includes an island that is surrounded by and connected to a compliant member, which is connected to a frame. Electrodes are disposed on the island and the frame to actuate the movable mirror. The island is preferably formed from a material that is more rigid than the compliant material, and preferably has a higher Young's modulus than the compliant member. The compliant member is preferably an elastic material with a relatively small Young's modulus, and a relatively high elastic limit. The frame is preferably formed from a rigid material, which may be the same material used for the island.

To obtain a wide tuning range, the compliant member should preferably display substantially linear-elastic behavior over a wide range of frequencies and should exhibit a substantial deformation range at low actuation forces. Entropic materials are one type of material that provides such behavior.

For repeatable and precise mirror displacements, the compliant member should preferably display positional and angular stability to within a tight tolerance. Entropic materials, particularly when operating in shear mode primarily, provide a very steep energy profile that enhances stability for a given device compliance. Examples of entropic materials include elastomers, aerogels, and long chained polymers.

External vibrations may alter the spacing of the mirrors, and thus alter the output signal produced by tunable Fabry-Perot filter. It is preferred that such vibration effects be reduced or eliminated, so that the mirror spacing depends only on the voltage applied to the drive electrodes. To reduce the effects of vibration, the tunable Fabry-Perot filter of the present invention may also be designed to compensate for vibration. Vibration compensation is achieved by replacing the mirror support of the tunable Fabry-Perot filter with a second moveable mirror.

Another key to achieving stable single-mode operation is packaging of the fiber laser components to eliminate vibration and acoustic induced noise. This is accomplished by mechanically decoupling the laser from the outside environment while providing temperature control through resistive heating.

These and other features and advantages of the invention will be apparent to those skilled in the art from the following detailed description of preferred embodiments, taken together with the accompanying drawings, in which:

DETAILED DESCRIPTION OF THE INVENTION

While the statement of Haber et al. regarding available filters was true in the year 2000, recently new types of tunable filters, namely high finesse (F>2000) fiber Fabry-Perot (Micron Optics) and MEMS-filters (Solus, CoreTek/ Nortel) have become available. Still the combination of these high finesse filters with Haber's ring laser would leave on the order of 100 modes under the filter peak and the continued susceptibility to mode-hopping. However, when used in combination with a high gain fiber that allows for short cavity length and correspondingly larger longitudinal mode spacing, these filters can now be use to build stable, mode-hop free fiber lasers that do not require an additional intracavity FFPI or multiwavelength element, therefore reducing the lasing threshold power and increasing the laser output power. The filter must provide a free spectral range (FSR) that exceeds the tuning range, a narrow linewidth at most ten and preferably less than four times the longitudinal mode spacing, and a stable peak.

The present invention provides a tunable single-mode fiber laser with output powers in excess of 50 mW over the C-band (1530 nm–1565 nm) with enhanced mode selectivity and stability. This is accomplished with an erbium-doped phosphate gain fiber that can provide a roundtrip unsaturated gain of at least 8 dB over the C-band with a mode spacing of at least 0.3 GHz. When used in combination with a tunable Fabry-Perot filter having a spectral width at most ten and preferably less than four times the longitudinal mode spacing, laser emission will be limited to a single longitudinal mode.

Figure 1:
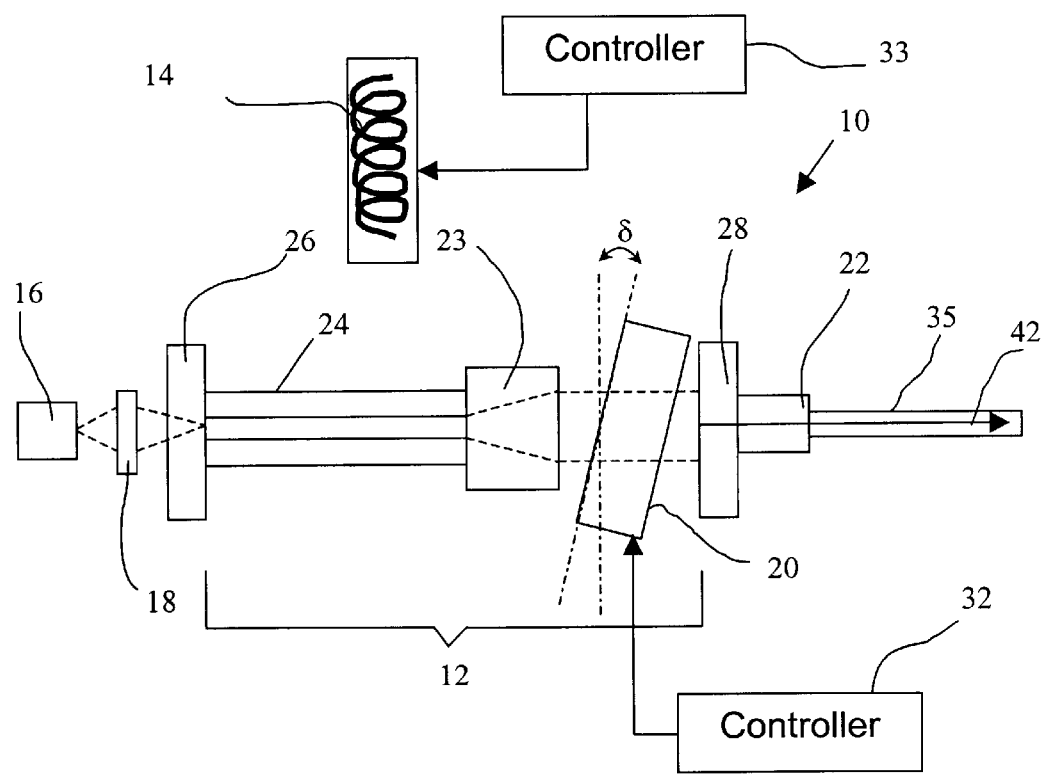
FIG. 1 is a schematic block diagram of a tunable single-mode fiber laser in accordance with the present invention.

As shown in FIG. 1, a tunable single-mode fiber laser 10 includes a short laser cavity 12 (up to 30 cm in length but typically less than 20 cm) provided with a thermal control element 14, preferably a resistive heater, an optical pump 16 and a pump coupler 18. Laser cavity 12 comprises a tunable Fabry-Perot filter 20 and a collimating lens 23 such as a grin or a ball lens on a section of erbium-doped phosphate gain fiber 24 (2–25 cm) formed between a pair of reflectors 26 and 28 that are highly reflective at the emission wavelength of the erbium ions and are substantially transparent at the pump wavelength. Reflector 26 has a reflectivity of near 100% over the C-band and is suitably a dielectric mirror formed on the end of gain fiber 24. Reflector 28 has a reflectivity of preferably 60% to 90% because it doubles as the output coupler for laser emission. Reflector 28 is suitably a dielectric mirror formed on the end of a collimating lens 22, which collimates the single-mode output 42 into a SMF 35. The lenses 23 and 22 are graded index (GRIN) lenses, ball lenses or any other standard lenses used to collimate light in and out of optical fibers. The lenses are attached to the fibers using standard assembly techniques.

In an alternate embodiment, the reflectors are replaced by fiber Bragg gratings. The use of Bragg gratings over reflectors has the advantage that the fiber grating can be fusion spliced to the active fiber 24, minimizing the losses at the interface between the reflector and gain fiber. Likewise, the fiber grating can be directly fusion spliced to a standard silica fiber 35. This is a convenient way to collect the laser output beam 42. The gratings defined in the core of the fiber gratings are broadband chirped gratings and provide reflectivity over the emission band of the active rare-earth ions that provide optical gain.

In another alternate embodiment, a second section of active fiber 24 can be placed in the cavity between lens 22 and reflector 28. This might have the beneficial effect of—increased output power by double side pumping as well as relaxing the requirements for low back reflection for the undesired wavelengths off the tunable filter.

Figure 2A:
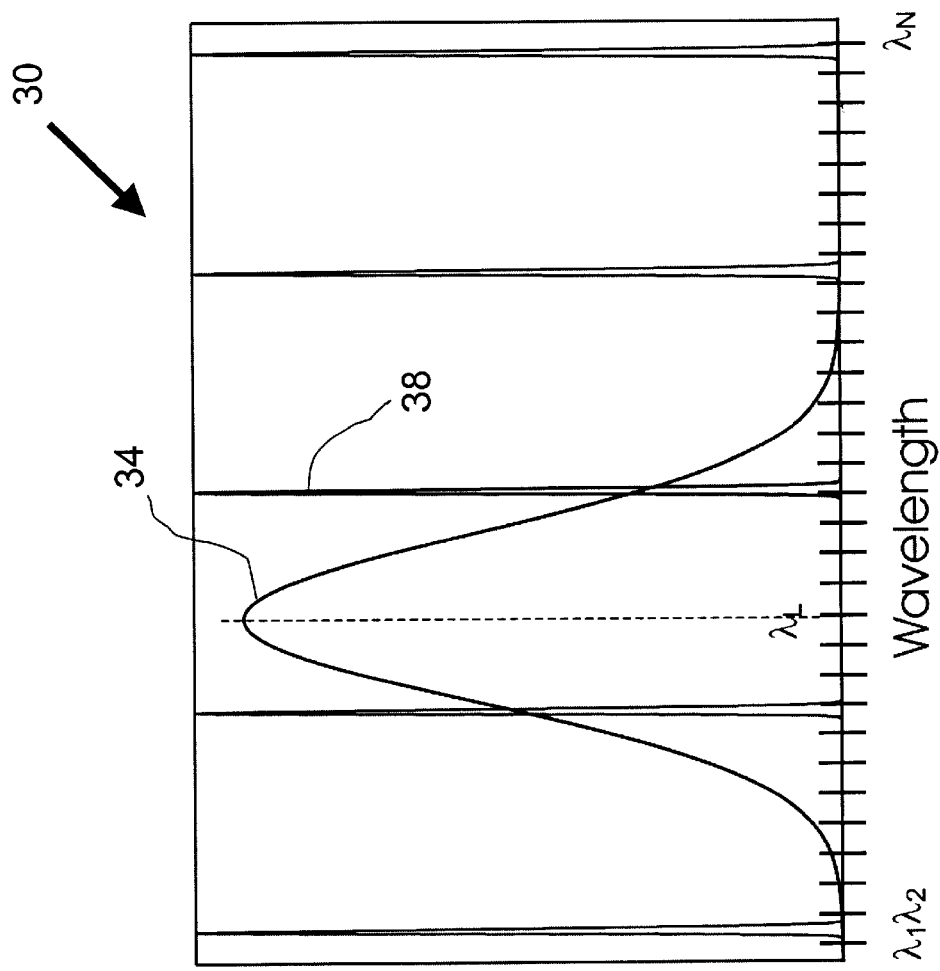
FIGS. 2a and 2b are plots of the cavity's mode structure and filter function illustrating tuning of the fiber laser.

The cavity is optically pumped using either single-mode core-pumping or multi-mode clad-pumping techniques to excite the erbium ions and provide gain, which establishes an initial longitudinal mode structure 30 as shown in FIG. 2a that spans the C-band with a mode spacing 31 of at least 0.3 GHz and a roundtrip unsaturated gain of at least 8 dB over the tuning range. Filter 20 is tilted at an angle $\delta$ to the optical path such that the wavelengths of the beam that are reflected by the filter are not coupled back into the core of the active fiber. This prevents laser emission from the sub-cavity formed between reflector 26 and the facet of filter 20.

Figure 2B:
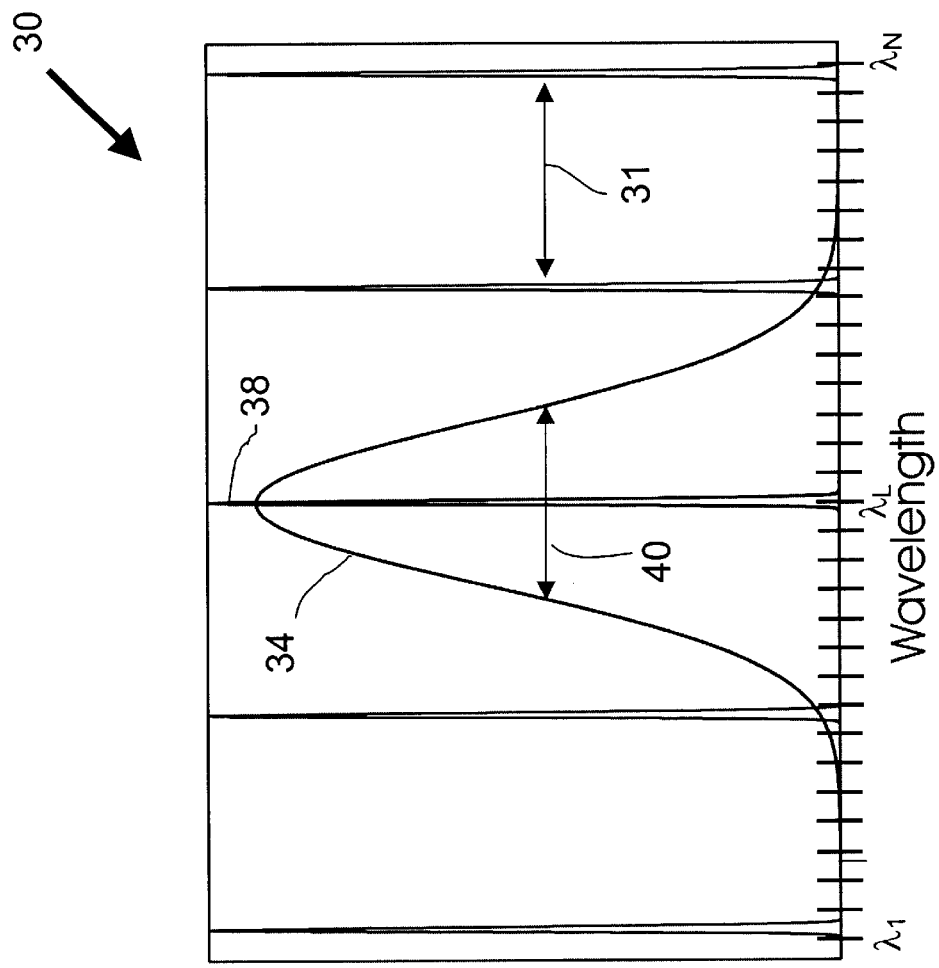

As shown in FIG. 2a, controller 32 tunes filter 20 to a desired lasing wavelength $\lambda_L$ inside the C-band. The wavelength can be varied continuously over the C-band or selected from a number of discrete output wavelengths $\lambda_1$, $\lambda_2$, ... $\lambda_N$. These discrete wavelengths can be established by including a multi-$\lambda$ reference element (see FIG. 9) in the optical path. This element establishes a periodic filter function whose transmission maxima fix the discrete wavelengths. Initially, the filter maximum 34 is aligned to $\lambda_L$ but most likely will not overlap with one of the cavity modes 38. In a second step, a controller 33 controls thermal control element 14 to adjust the longitudinal mode structure to align a single cavity mode 38 with transmission maxima 34 of the filter as shown in FIG. 2b. Because the spectral width 40 of the filter function is at most ten and preferably less than four times the longitudinal mode spacing 31, all but the desired lasing wavelength $\lambda_L$ will be effectively suppressed and laser emission 42 will be limited to a single longitudinal mode. A $\lambda$-locker that includes the multi-$\lambda$ reference element (also shown in FIG. 9) can be used to lock the single-mode output signal to the desired discrete output wavelength $\lambda_L$.

Single-Mode Laser Design

To ensure stable single-mode operation at output powers in excess of 50 mW, it is essential to ensure that only a few cavity modes fit inside the spectral width of the filter function. A short cavity of 30 cm length or less, combined with a filter function with a full-with half-maximum (FWHM) of at most ten and preferably less than four times the free spectral range of the laser cavity ensures robust and mode-hop free single frequency operation. In the example depicted in FIGS. 2a and 2b, the FWHM is comparable to the FSR of the cavity.

Er-Doped Phosphate Fiber

A key to achieving stable single-mode operation over the C-band with output powers in excess of 50 mW is the erbium-doped phosphate gain fiber 24. The fiber must provide sufficient gain per unit length so that the roundtrip unsaturated gain in the cavity is at least 8 dB and the mode spacing is at least 0.3 GHz. The fiber is drawn from a phosphate glass preform that is doped with 0.5–5.0 wt. % and preferably 1–3 wt. % erbium ions to form a highly doped core surrounded by a phosphate cladding. In some instances the glass may be further doped with ytterbium; 0.5–5 wt. % (single-mode core pumped) or 5–20 wt. % ytterbium ions (multi-mode clad pumped). Initial experiments have demonstrated that this class of phosphate glass supports continuous single-mode lasing without self-pulsation at the high doping concentrations required to provide sufficient gain in the short cavity lengths necessary to support high power single-mode lasers.

The ultra-short highly absorbing fibers utilize a subclass of multi-component glasses that comprises a phosphate network former ($P_2O_5$) of 50 to 75 mole percent. Below 50 mol. % the glass becomes unstable and above 75 mol. % the glass is difficult to melt due to the severe vaporization of phosphate during the glass melting process. The glass comprises a network intermediator XO of 5 to 15 mole percent selected from PbO, ZnO, $WO_3$, $Y_2O_3$, $Al_2O_3$, $B_2O_3$ and mixtures thereof. The intermediator content has to be high enough to ensure high mechanical strength and good chemical durability and no so high as to cause the glass to devitrify. The glass further comprises a network modifier MO of 18 to 41 mole percent selected from alkaline-earth oxides and transition metal oxides such as BaO, BeO, MgO, SrO, CaO, ZnO, PbO and mixtures thereof. Lastly, the glass includes a rare earth dopant $La_2O_3$ of 0.5 to 25 weight percent. $La_2O_3$ is replaced with $Er_2O_3$, $Yb_2O_3$ and other rare-earth oxides and mixtures thereof in active glasses for fiber lasers. $La_2O_3$, $Er_2O_3$, $Yb_2O_3$ and other rare-earth ions exhibit very similar chemical and physical properties while $La_2O_3$ has no absorption band from UV to NIR. Thus, $La_2O_3$ is a good substitute for other rare-earth ions in glasses to ensure that the properties of glasses with different doping concentrations are similar. In glass compositions, the multi-component glass, intermediator and modifier are typically specified in mole % because the glass structure is related with the mole % of every element in the glass and the dopants are typically specified in weight % because the doping concentration in term of ions per volume, e.g., ions per cubic centimeters, can be readily derived and is critical information for photonic and optical related applications.

Gain fiber 24 and its phosphate glass composition are described in detail in co-pending U.S. patent application Ser. No. 09/589,764 entitled "Erbium and Ytterbium Co-Doped Phosphate Glass Optical Fiber Amplifiers Using Short Active Fiber Length" filed Jun. 9, 2000 and Ser. No. 10/056,830 entitled "Rare-Earth Doped Phosphate-Glass Single-Mode Fiber Lasers", which are hereby incorporated by reference.

Figure 3A:
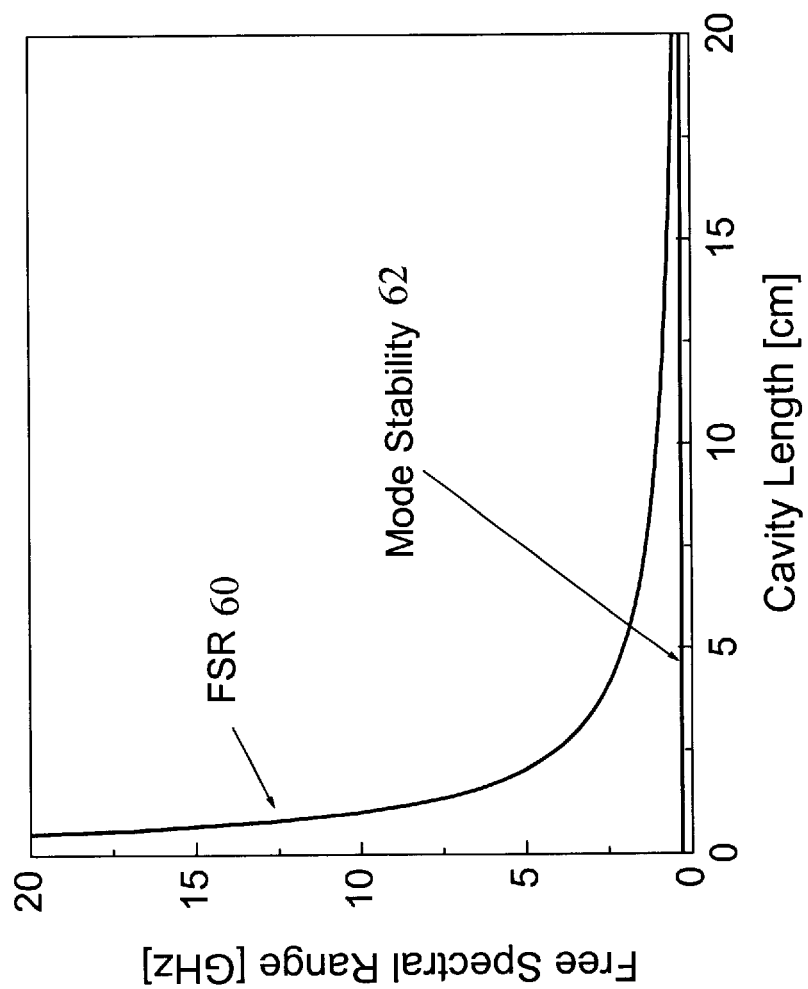
FIGS. 3a and 3b are plots of the gain fiber's free spectral range (FSR) versus cavity length and the sensitivity of longitudinal modes to temperature changes, respectively, illustrating the open-loop stability of the tunable laser.
Figure 3B:
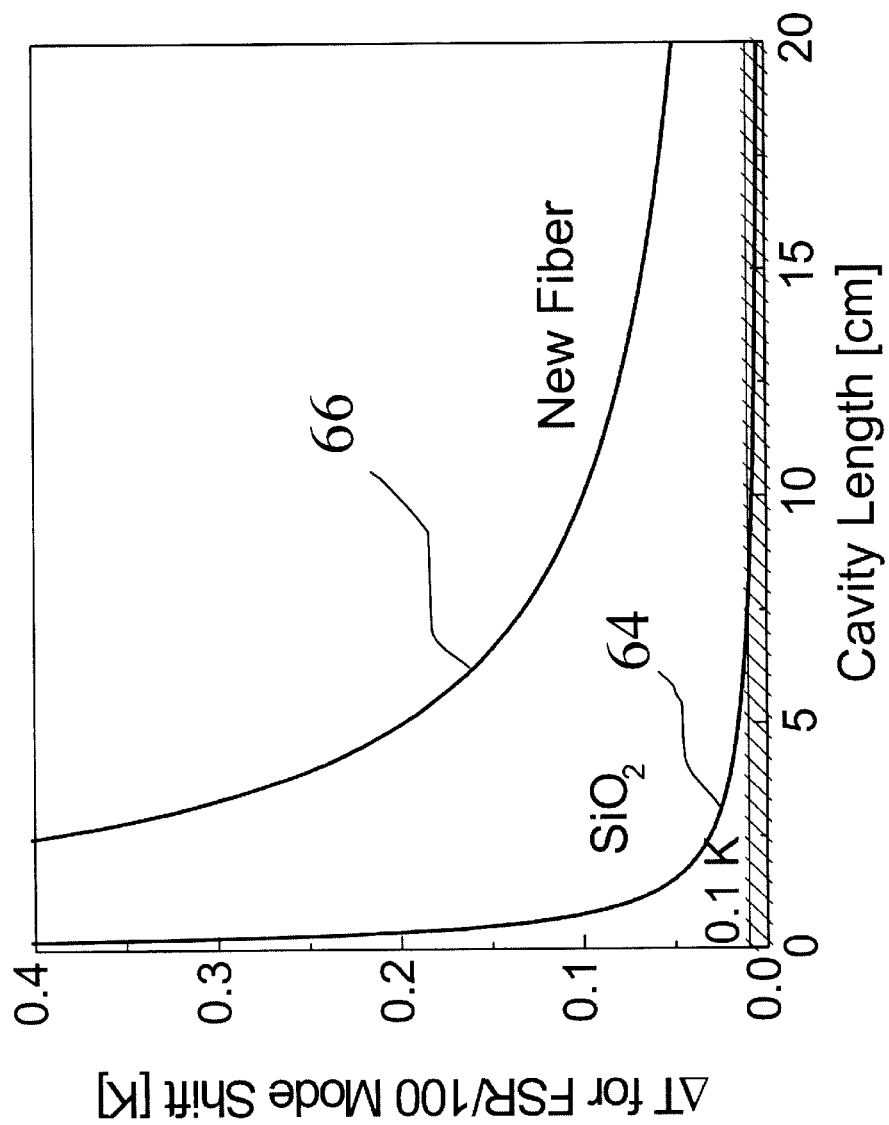

The unique combination of a high gain short cavity that produces wide mode spacing and a glass cavity whose refractive index is insensitive to thermal induced changes yields a tunable single-mode fiber laser that can operate open-loop without significant fluctuations in output power or wavelength or significant risk of multi-mode lasing. The cavity mode fluctuation in 0.5 to 2 cm long fiber cavities that are excited above the lasing threshold have been measured to be about 40 MHz for single-mode pumping with a semiconductor pump laser and are less than 300 MHz in the case of multimode cladding pumping with broad area semiconductor lasers. FIG. 3a shows the free spectral range (FSR) 60 as a function of the total cavity length. The picture illustrates that the gain fiber (cavity) length should be less than 30 cm in order to ensure that the pump induced phase shift 62 is small compared to the distance between fringes. FIG. 3b shows plots of the temperature changes 64 and 66 that are necessary to shift longitudinal modes by one hundredth's of one FSR for typical silica and the phosphate fiber 24, respectively. With respect to mode stabilization via temperature control, the phosphate gain fiber 24 has a clear advantage and longer cavities can be used. If one compares the typical temperature fluctuation of 0.01 K achievable with a standard TEC control circuit 68, gain fiber 24 cavities of up to 70 cm do not pose a temperature problem, while for the same stability, typical silica fiber cavity should be kept shorter than 7 cm.

Tunable Fabry-Perot Filter

A key to achieving stable single-mode operation over the C-band with enhanced mode selectivity is the performance of the tunable Fabry-Perot filter 20. Recently new types of tunable filters, namely high finesse (F>2000) fiber Fabry-Perot (Micron Optics) and MEMS-filters (Solus, CoreTek/Nortel) have become available. These filters provide a free spectral range (FSR) that exceeds the tuning range, e.g. 35 nm of the C-band, a narrow linewidth at most ten and preferably less than four times the longitudinal mode spacing, which is determined by cavity length and a stable peak.

A particular MEMS filter is described in co-pending PCT Patent Application No. PCT/US02/12496 filed Apr. 22, 2002, entitled "MEMS-Based Tunable Fabry-Perot Filters and Method of Forming Same", which is hereby incorporated by reference. Any of the embodiments disclosed therein can be employed to realize the tunable fiber laser according to the invention discussed herein.

Figure 4A:
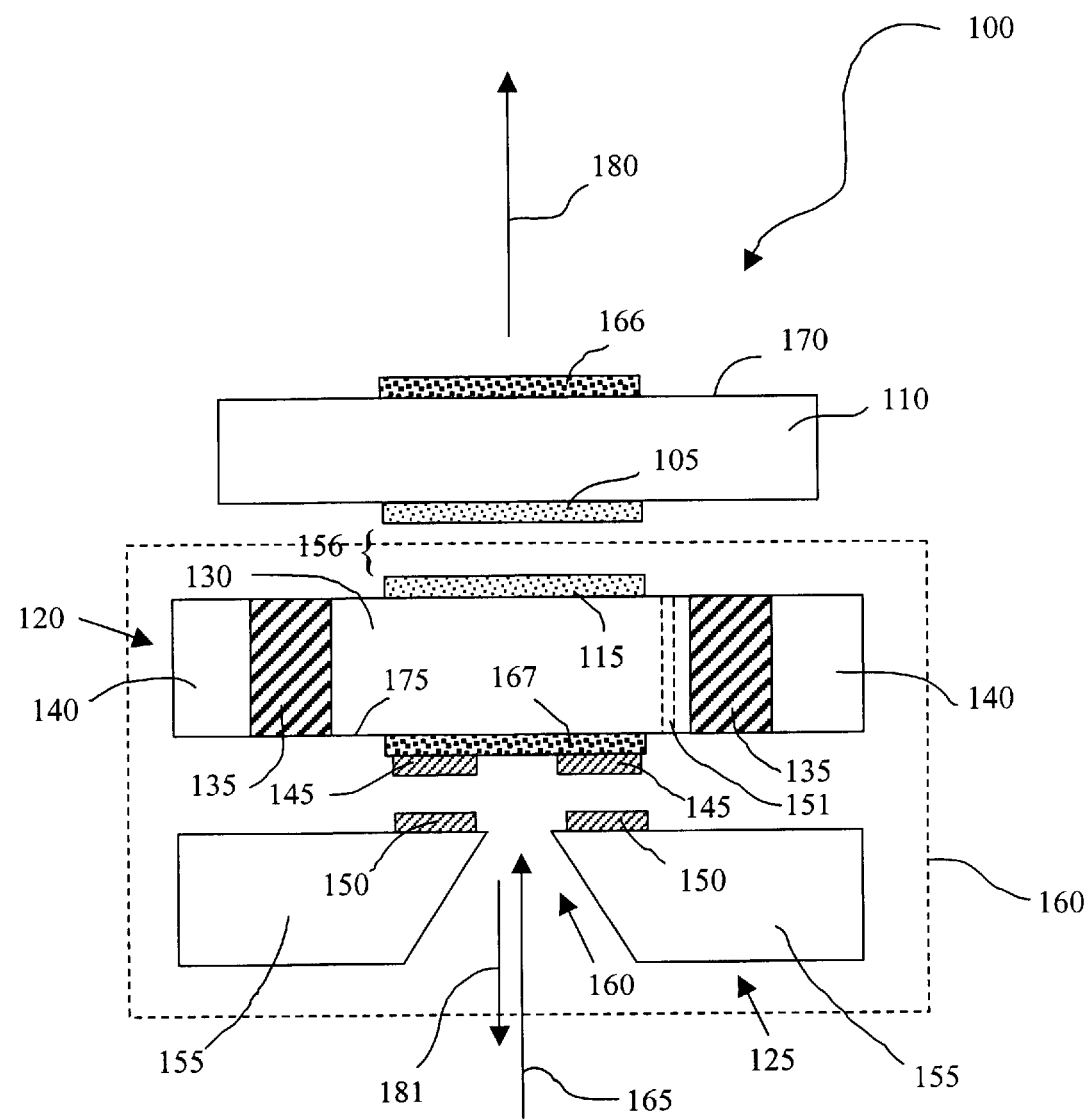
FIGS. 4a and 4b are cross-sectional views of a tunable MEMS Fabry-Perot filter.
Figure 4B:
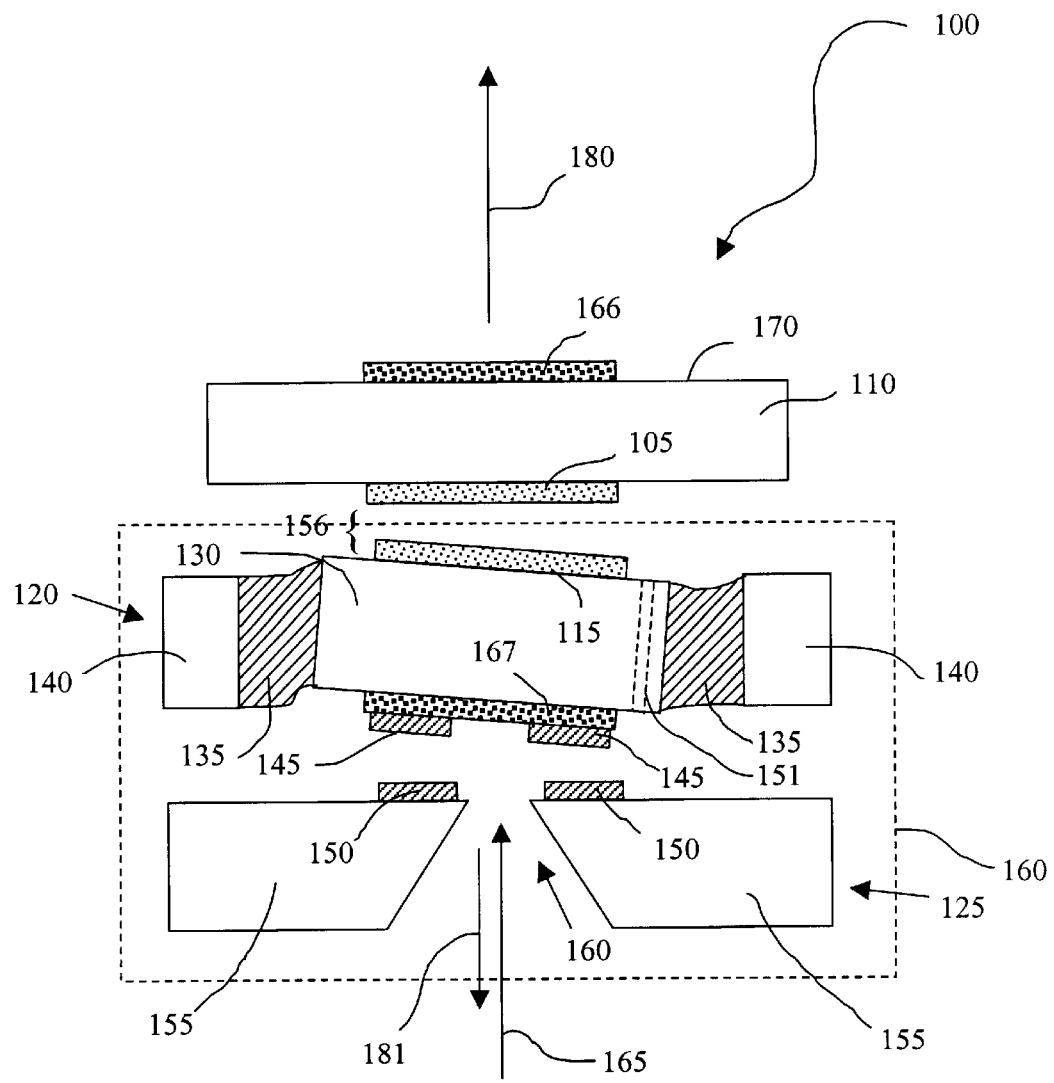

FIGS. 4a and 4b are cross-sectional views of a tunable MEMS Fabry-Perot filter 100, in accordance with one embodiment of the present invention. The tunable Fabry-Perot filter 100 includes a first mirror 105 supported by a mirror support 110, a second mirror 115 supported by a compliant mechanism 120, and an actuator support 125. The compliant mechanism 120 includes an island 130 that is surrounded by and connected to a compliant member 135. The compliant member 135 is surrounded by and connected to a frame 140.

The island 130 is preferably formed from a material that is more rigid than the compliant material 135, and preferably has a higher Young's modulus than the compliant member 135. Compliant member 135 is preferably an elastic material with a relatively small Young's modulus, and a relatively high elastic limit. The frame 140 is preferably formed from a rigid material, which may be the same material used for the island 130.

A first set of electrodes 145 is disposed on the island 130 on a side of the island 130 opposite the second mirror 115. The actuator support 125 includes a second set of electrodes 150 disposed on an actuator frame 155. The electrodes can be formed from any type of conductive material such as gold, silver, aluminum, or copper, as well carbon and conductive polymers or oxides. Additionally, transparent conductors may be used, while still falling within the scope of the present invention.

The compliant mechanism 120 and the actuator support 125 together form an actuated support 160, which is described in detail in co-pending related U.S. application Ser. No. 10/085,143, file Mar. 1, 2002 entitled "Compliant Mechanism and Method of Forming Same", which is incorporated by reference in its entirety.

The first and second mirrors 105 and 115 are preferably highly reflective low loss dielectric coatings, and are positioned to form the resonant cavity 156 of the tunable Fabry-Perot filter 100. The mirrors may also be formed from fully or partially reflective metal coatings, while still falling within the scope of the present invention. The actuator frame 155, and first and second sets of electrodes 145 and 150 preferably contain openings 160 for allowing input light 165 to be coupled into the resonant cavity 156 of the tunable Fabry-Perot filter 100. Alternatively, the actuator frame 155 and electrodes 145 and 150 can be made of a material that is substantially transparent to the input light 165 to obviate the need of openings 160. Anti-reflection (AR) coatings 166 and 167 are preferably disposed on surfaces 170 and 175 of the mirror support 110 and island 130.

The electrodes 145 and 150 are configured to receive and/or transmit voltage signals to electronic circuits external to the tunable Fabry-Perot filter 100. In operation, command signals from a controller (not shown) are applied to the first and second sets of electrodes 145 and 150, which generate an electrostatic force that moves the island 130, and therefore the second mirror 115. In this way, the spacing of the resonant cavity 156, and thereby the frequency for which the light signal 180 is transmitted, can be adjusted. The compliant member 135 exerts a restoring force to the island 130, which tends to urge the island 130 back into alignment with the frame 140 when the electrostatic force is removed. Reflected light 181 generally represents that portion of input light 165 that is not transmitted through the resonant cavity to become transmitted light 180. It will be recognized that input light readily could be reversed and enter the device from the opposite side of the resonant cavity, which generally will reverse transmitted light 180 and reflected light 181.

The mirror support 110, compliant mechanism 120 and the actuator support 125 are assembled suitably, to form the tunable Fabry-Perot cavity 100. After assembly, the resonant cavity 156 may contain a trapped volume of air. As a result, movement of the island 130 may be impeded by pressure or vacuum formation in the resonant cavity 156. Additionally, the trapped air can make the tunable Fabry-Perot filter sensitive to thermally induced pressure changes, and barometrically induced movement of the island as the atmospheric pressure changes. To mitigate against such pressure induced motion of the island 130, a pressure relief channel 151 is preferably formed in the island or in the frame 140. In FIG. 4a, the pressure relief channel 151 passes through the island 130 to vent the resonant cavity 156 to the atmosphere. However, the resonant cavity 156 may be vented by another channel or technique that will prevent a trapped volume of air in the resonant cavity 156. Alternatively, in embodiments where sensitivity to thermal, barometric or related changes is desired, the cavity could be left with the trapped volume. This technique could enhance the ability of the device to function as a sensor.

To obtain a wide tuning range, the compliant member 135 should preferably display substantially linear-elastic behavior over a wide range of frequencies and should exhibit a substantial deformation range at low actuation forces. Entropic materials are one type of material that provides such behavior.

For repeatable and precise mirror displacements, the compliant member 135 should preferably display positional and angular stability to within a tight tolerance. Entropic materials, particularly when operating in shear mode primarily, provide a very steep energy profile that enhances stability for a given device compliance. Examples of entropic materials include elastomers, aerogels, and long chained polymers.

An important parameter affecting the performance of a Fabry-Perot filter is how far from parallel the first and second mirrors 105 and 115 are with respect to each other. This parameter is sometimes referred to as the "tilt offset." Tilt offset can arise from manufacturing variances. It also can arise from certain environmental factors, such as vibrations transmitted through the atmosphere, and vibrations transmitted through the substrate onto which the tunable Fabry-Perot filter 100 is mounted. Other environmental influences that can alter the spacing between the first mirror 105 and the second mirror 115 include changing the orientation of the tunable Fabry-Perot filter 100 relative to the earth's gravitational field. Such changes in orientation can cause the island 130 to displace at different distances and angles relative to the mirror support 110.

The first and second sets of electrodes 145 and 150 are preferably configured to allow a tilting force to be applied to the island 130, in order to fine-tune the Fabry-Perot cavity 156. The first and second sets of electrodes 145 and 150 can be configured in any pattern required for obtaining a desired motion of the island 130.

Figure 5B:
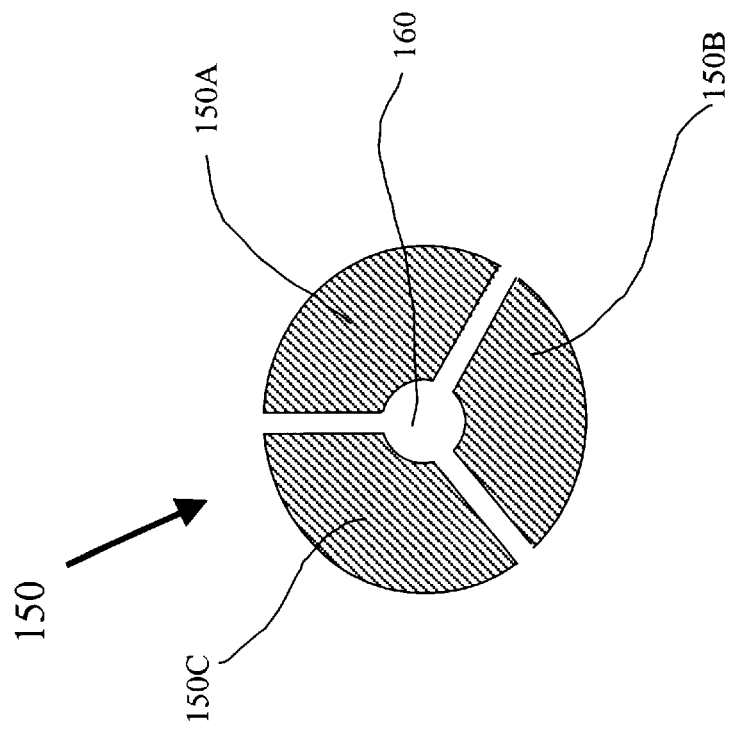
FIGS. 5a and 5b are plan views of one preferred embodiment of the first and second sets of electrodes used in tunable MEMS Fabry-Perot filter of FIGS. 4a and 4b.
Figure 5A:
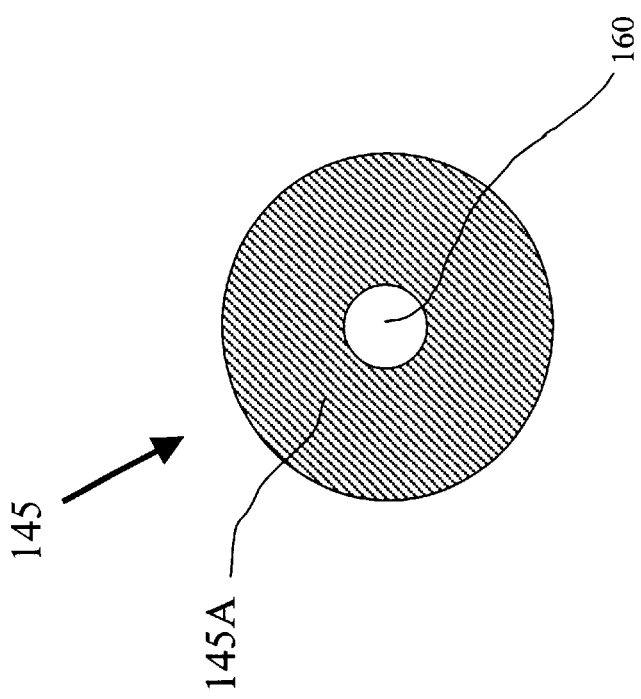

FIGS. 5a and 5b are plan views of one preferred embodiment of the first and second sets of electrodes 145 and 150, respectively. In this embodiment, three electrodes 150A–150C make up the second set of electrodes 150, and a single common electrode 145A is used for the first set of electrodes 145. It should be appreciated that this arrangement could be reversed, so that the three electrodes 150A–150C could be placed on the island 130, while the common electrode 145A is placed on the actuator support 125.

As discussed above, first and second sets of electrodes 145 and 150 are configured to generate an electrostatic force when a command signal (voltage) is applied thereto. The command signal can be configured to create a repulsive or an attractive electrostatic force between the electrodes. However an attractive electrostatic force is the preferred mode of operation.

During displacement, up and down motion of the island 130, and therefore the spacing of the resonant cavity 156, can be controlled by applying a voltage between the three electrodes 150A–150C and the counterelectrode 145A. The finesse and insertion loss of the Fabry-Perot filter is dependent on the tilt offset between the first and second mirrors 105 and 110. It should be understood that the finesse of the tunable Fabry-Perot filters 100 is also dependent on the reflectivity of the mirrors 105 and 115 and other factors. The three-electrode structure shown in FIG. 5b for the second set of electrodes 150 allows for control of the tilt of the island 130, and therefore the second mirror 115, with respect to the first mirror 105. This is accomplished by selectively applying a stronger voltage to one or more of the three electrodes 150A–150C. Although, in this embodiment, three electrodes are used for the second set of electrodes 150, a different electrode pattern and a different number of electrodes can be used while still falling within the scope of the present invention.

In order to control tilt offset, it is preferable to have a sensing mechanism that will indicate how much tilt offset is present. In one embodiment, the tilt offset is determined using optical feedback. With this technique, the tunable Fabry-Perot filter 100 is scanned until an output signal 180 is detected. The signature of the output signal 180 can be used to uniquely determine both the spacing between the two mirrors and the tilt offset, if any.

Figure 6B:
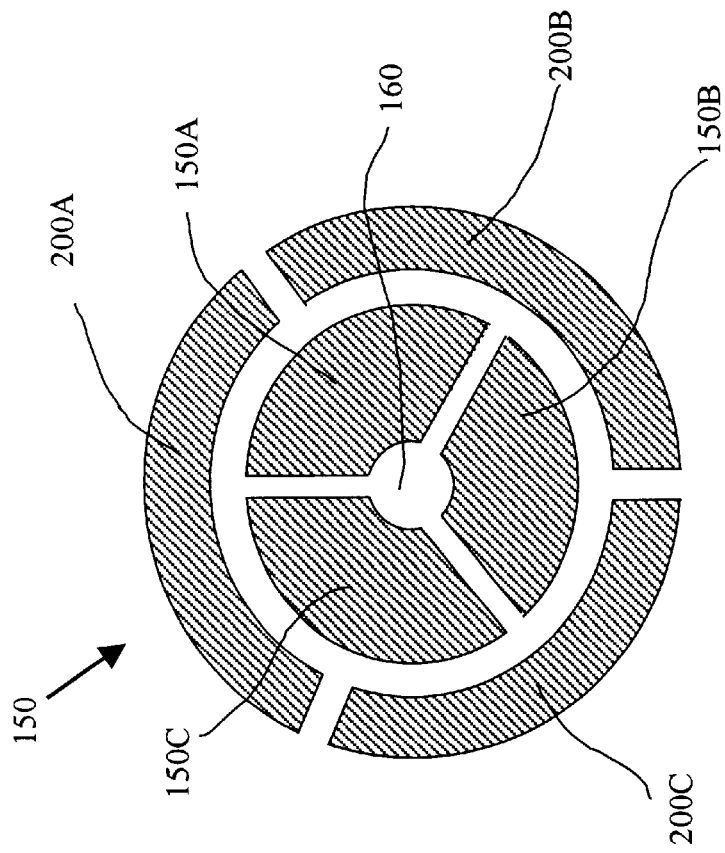
FIGS. 6a and 6b are plan views of an electrode pattern that can be used for sensing tilt error.
Figure 6A:
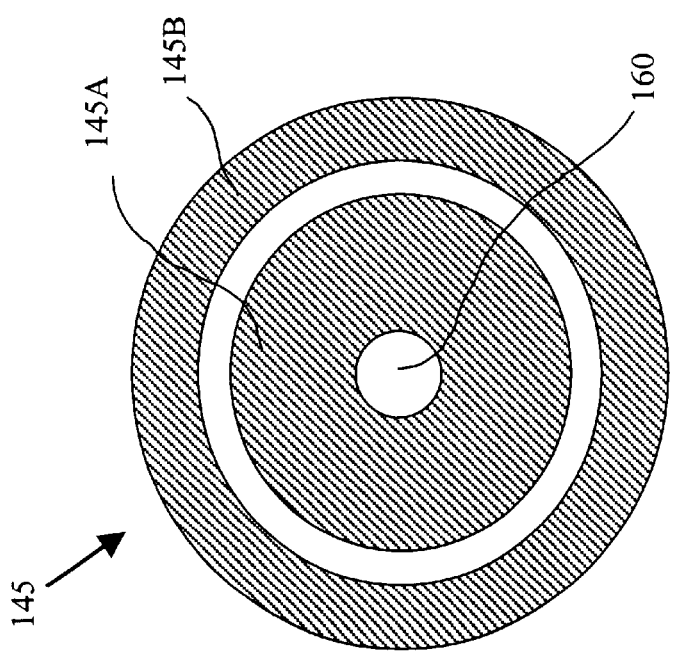

The power of the output signal 180 is preferably monitored with a photodiode (not shown). When the first and second mirrors 105 and 115 are parallel, the power of the output signal 180 generally is maximized. As the tilt offset increases, the power of the output signal 180 generally decreases. The electrode structure shown in FIGS. 5a and 5b can be used to control the tilt of the island 130 so as to maximize the power of the output signal 180 for a predetermined cavity spacing. As an alternative to optical feed back, tilt offset can be measured capacitively. FIGS. 6a and 6b are plan views of an electrode pattern that can be used for sensing tilt offset without having to monitor the output signal 180, in accordance with one embodiment of the present invention. This electrode pattern utilizes capacitive sensing for determining tilt offset.

In this embodiment, the second set of electrodes 150 comprises individual electrodes 150A–150C that are used for moving the island 130, as discussed above. In addition, three capacitive sensing electrodes 200A–200C are provided. The first set of electrodes, shown in FIG. 6a, comprise counterelectrode 145A and counter capacitive sensing electrode 145B.

In order to sense the tilt offset, the capacitance between capacitance sensing electrodes 200A–200C and counter capacitive sensing electrode 145B is monitored. The capacitance is measured at each of the electrodes 200A–200C and then translated into a tilt offset by proper calculation.

Virtually any number of electrode geometries to control mirror spacing and tilt, as well as to capacitively measure mirror spacing and tilt may be used. It should be appreciated that electrode geometries, which achieve the desired level of mirror spacing, tilt control and sensing are preferred. Various electrode patterns are shown, but are not exhaustive of possible patterns.

External vibrations may alter the spacing of the mirrors, and thus alter the output signal produced by tunable Fabry-Perot filter. It is preferred that such vibration effects be reduced or eliminated, so that the mirror spacing depends only on the voltage applied to the drive electrodes. To reduce the effects of vibration, the tunable Fabry-Perot filter of the present invention may also be designed to compensate for vibration.

Figure 7:
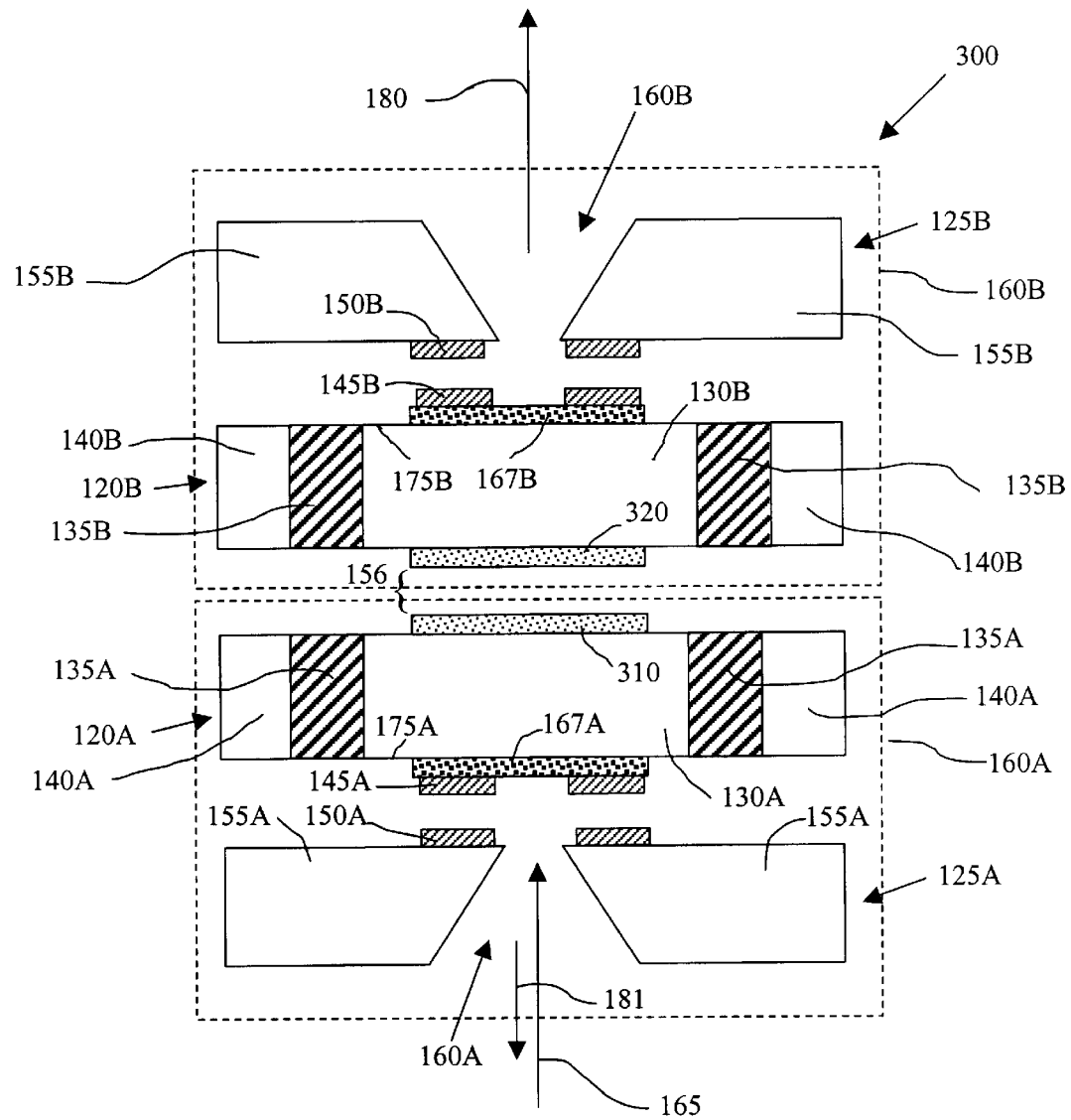
FIG. 7 is a cross-sectional view of a vibration compensated tunable MEMS Fabry-Perot filter.

FIG. 7 is a cross-sectional view of a vibration compensated tunable MEMS Fabry-Perot filter, in accordance with another embodiment of the present invention. An embodiment of the vibration compensated tunable Fabry-Perot filter has a structure, which is very similar to the tunable Fabry-Perot filter illustrated in FIG. 4a. As illustrated in FIG. 7, the vibration compensated tunable Fabry-Perot filter 300 can be constructed by replacing the mirror support 110 of the tunable Fabry-Perot filter 100 (of FIG. 4a) with a second moveable mirror. Thus, as illustrated in FIG. 7, an embodiment of the vibration compensated tunable Fabry-Perot filter includes a first actuated support 150A coupled to a second actuated support 160B. With such a configuration, the resonant cavity 156 is bounded by two movable mirrors rather than a single moveable mirror and a fixed mirror.

As suggested for this embodiment, the vibration compensated tunable Fabry-Perot filter 300 includes first and second actuated supports 160A and 160B positioned such that respective mirrors 310 and 320 form resonant cavity 156 of the vibration compensated tunable Fabry-Perot filter 300. Actuated support 160A includes mirror 310, which is supported by a compliant mechanism 120A. Compliant mechanism 120A includes an island 130A that is surrounded by and connected to a compliant member 135A. Compliant member 135A is surrounded by and connected to a frame 140A.

The driving electrodes of the vibration compensated tunable Fabry-Perot filter 300 may have geometries similar to the tunable Fabry-Perot filter 100 of FIG. 4a. Thus, for mirror driving purposes, a first set of electrodes 145A is disposed on the island 130A on the side of the island opposite the mirror 310. The actuator support 125A includes a set of electrodes 150A disposed on an actuator frame 155A. Sensing electrodes may be utilized in some embodiments.

Second actuated support 160B includes a compliant mechanism 120B, which supports mirror 320, and an actuator support 125B. The compliant mechanism 120B includes an island 130B that is surrounded by and connected to a compliant member 135B. Compliant member 135B is surrounded by and connected to a frame 140B.

A first set of electrodes 145B is disposed on the island 130B on a side of the island opposite the mirror 320. The actuator support 125B includes a second set of electrodes 150B disposed on an actuator frame 155B.

The mirrors 310 and 320 are preferably highly reflective low loss dielectric coatings, and are positioned to form the resonant cavity 156 of the vibration compensated tunable Fabry-Perot filter 300. The actuators 125A and 125B, and their respective electrodes 145A, 145B, 150A, and 150B, preferably contain openings 160A and 160B for allowing input light 165 to be coupled into the resonant cavity 156 and for allowing transmitted light 180 and reflected light 181 to be coupled out of resonant cavity 156. Alternatively, the actuators 125A and 125B, and their respective electrodes may be formed of materials that are substantially transparent to the input and output light, thus obviating the need for openings 160A and 160B. Anti-reflection coatings 167A and 167B are preferably disposed on surfaces 175A and 175B of islands 130A and 130B, respectively.

For vibration compensation to be most effective, it is preferred that compliant mechanisms 120A and 120B have substantially matched physical characteristics. Important physical characteristics to match between the compliant mechanisms 120A and 120B include the masses of the islands 130A and 130B, and the stiffness of the compliant mechanisms 120A and 120B. By substantially matching the mass and stiffness of the compliant mechanisms 120A and 120B, each compliant optical support will have substantially the same response to vibration. The stiffness of the compliant mechanisms 120A and 120B consists principally of two components: elastic and electrostatic. The former is based principally on material properties and geometries of compliant members 135A and 135B. The latter is caused by non-linearity of the electrostatic force and plays the role of a negative spring, wherein the effective stiffness is not increased, but rather decreased due to electrostatic force.

For each compliant member (either 135A or 135B), the effective stiffness can be expressed by the following equation:

$$K_{eff} = K - \epsilon S V^2 / d^3 \quad (1)$$

where

K is the elastic stiffness, $\epsilon$ is the permittivity of air (approximately equal to the permittivity of a vacuum $\epsilon_0 = 8.854 \times 10^{-12}$ F/m), S is the total area of the electrodes (either 150A or 145A or 145B or 150B), d is the thickness of the gap between the appropriate electrodes (either between 150A and 145A, or between 150B and 145B), and V is the voltage (the electric potential difference) between the appropriate electrodes.

In the case where each electrode is a system of N similar electrodes (to control tilt on islands 130A and 130B), $$V=\sqrt{(\Sigma V_j^2/N)} \text{ for } j=1 \text{ to } N \qquad (2)$$

where $V_j$ is the voltage on j-th electrode (j=1, . . . ,N).

As seen from equation (1), the same effective stiffness can be obtained for two systems, even if their elastic stiffnesses are not similar. The difference in elastic stiffness can be compensated by the electrostatic components. However, the symmetric solution seems the most practical, even though the ideal symmetry is not feasible. For instance, a relative difference of 5% in elastic stiffness is still effective to provide good vibration reduction for many applications.

The importance of the mass equality condition follows from the equation expressing the amplitude of displacement of each island (either 130A or 130B) under environmental vibration (for simplicity, we consider just one harmonic with frequency f and acceleration amplitude A):

$$X=MA/(K_{eff}\sqrt{([1-(-f/f_{nat})^2]^2+\eta^2)}) \qquad (3)$$

where the natural frequency of the island is $$f_{nat}=(1/2\pi)\sqrt{(K_{eff}/M)} \qquad (4)$$

and η is the total loss factor of the compliant member (either 135A or 135B). The natural frequency of practical compliant members generally exceeds at least 2000 Hz. At such high frequencies, environmental accelerations are usually created by acoustical noise and, in any case, are rather low. The resonance is significantly damped by mechanical energy dissipation in the compliant members and in the air gap between the electrodes (squeeze-film damping). Accordingly it is important to address frequency range at low frequencies (f<<$f_{nat}$).

In this case, equation (3) reduces to $$X=MA/K_{eff} \qquad (5)$$

because the total loss factor at low frequencies is usually much less than 1. As follows from equation (5), the role played by the mass is as significant as that of the effective stiffness. However, as discussed above, the mass can be accurately controlled in the manufacturing process.

The other secondary condition is related to the loss factor. Although at low frequencies it does not notably affect the displacement amplitude, it determines the phase shift between the displacement and environmental acceleration. If the total loss factors of the compliant members 135A and 135B are significantly different, the members do not move in the same phase. However, the possible phase shift is reasonably low if the compliant members are made of the same material on the same manufacturing line.

Regarding the physical characteristics of the compliant mechanisms 120A and 120B, by substantially matching the mass of the islands 130A and 130B and the compliance of the compliant members 135A and 135B, each compliant mechanism 120A and 120B will have substantially the same resonant frequency, and will exhibit substantially similar displacement when subjected to an external vibration. Thus, when the vibration compensated tunable Fabry-Perot filter 300 is subjected to an impulse force or vibration, the distance between the mirrors 310 and 320 that make up the resonant cavity 156 will remain substantially constant because each island 130A and 130B will move substantially the same amount and in the same direction in response to the force or vibration. Accordingly, the spacing of the resonant cavity 156 will remain substantially constant, even though the mirrors 310 and 320 attached to the islands 130A and 130B are in motion.

The technique for vibration compensating the device effectively places each mirror within an independent suspension system (compliant member and electrostatics) with each suspension system approximately matched to the other.

Fiber Laser Packaging

Figure 8:
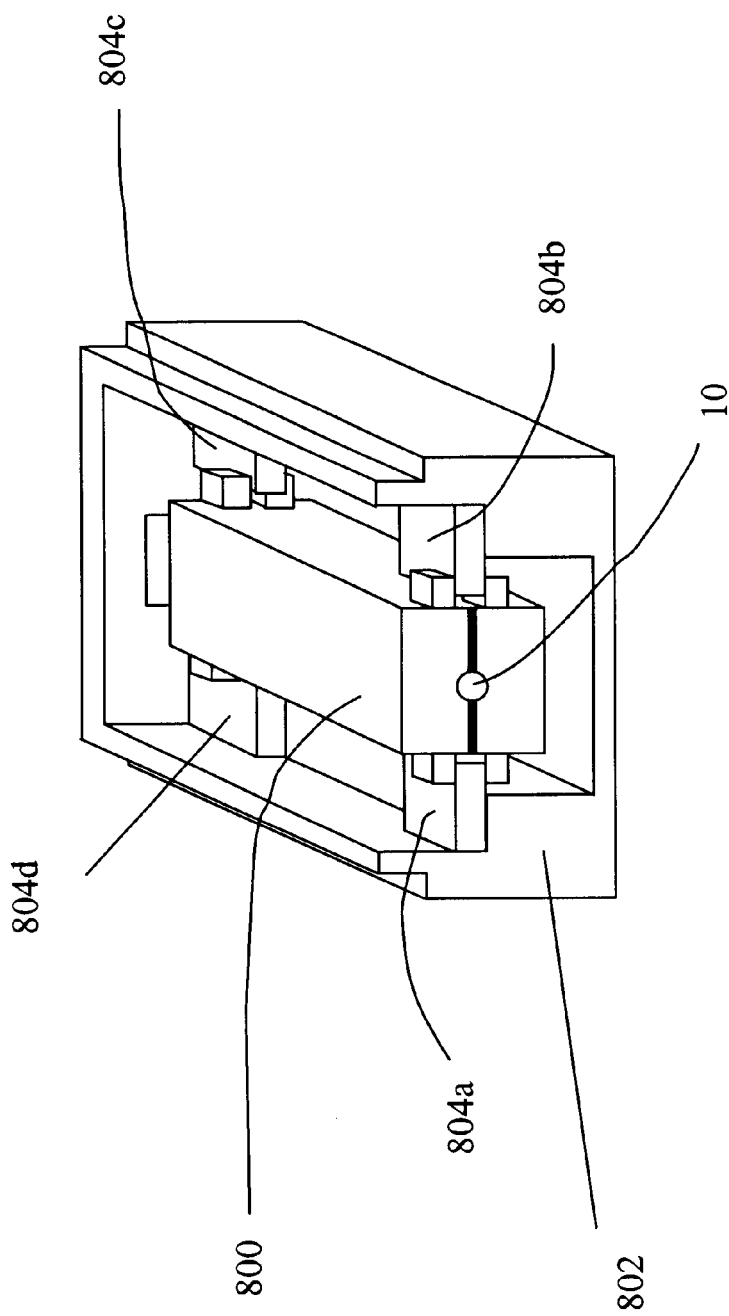
FIG. 8 is a diagram of a packaged tunable single-mode fiber laser.

Another key to achieving stable single-mode operation is packaging of the fiber laser components. The single mode tunable lasers described in FIGS. 1–3 are placed inside a package that provides thermal and vibrational isolation. The preferred way to provide thermal and vibrational isolation simultaneously is to use resistive heating instead of standard thermoelectric cooling. When thermoelectric cooling (TEC) is used, the TEC plate is rigidly attached to the package substrate to provide good heat sinking. This provides simultaneously poor vibrational isolation. In contrast, with resistive heating, as shown in FIG. 8 laser 10 is mounted on a rigid substrate 800 that is heated and maintained at a constant temperature that is above room temperature. The rigid substrate provides good mechanical and thermal stability to the laser itself. This is necessary for stable laser output. The rigid laser substrate is connected to the package 802 with a compliant supports 804a–d such as a plastic material with a relatively small Young modulus and a small thermal conductivity coefficient. This packaging provides good thermal and vibrational isolation to the laser from the outside environment.

In another embodiment, a multi-λ reference element (a piece of quartz sandwiched between a pair of reflective coatings and mounted on a TEC) is placed in the optical path to establish a periodic filter function having transmission maxima that fix the discrete output wavelengths 38 shown in FIGS. 2a and 2b. When configured with a tunable Fabry-Perot filter, a λ-locker, which includes the multi-λ reference element, is preferably placed outside the cavity to both establish the wavelength reference and lock the laser emission to a desired wavelength.

Figure 9:
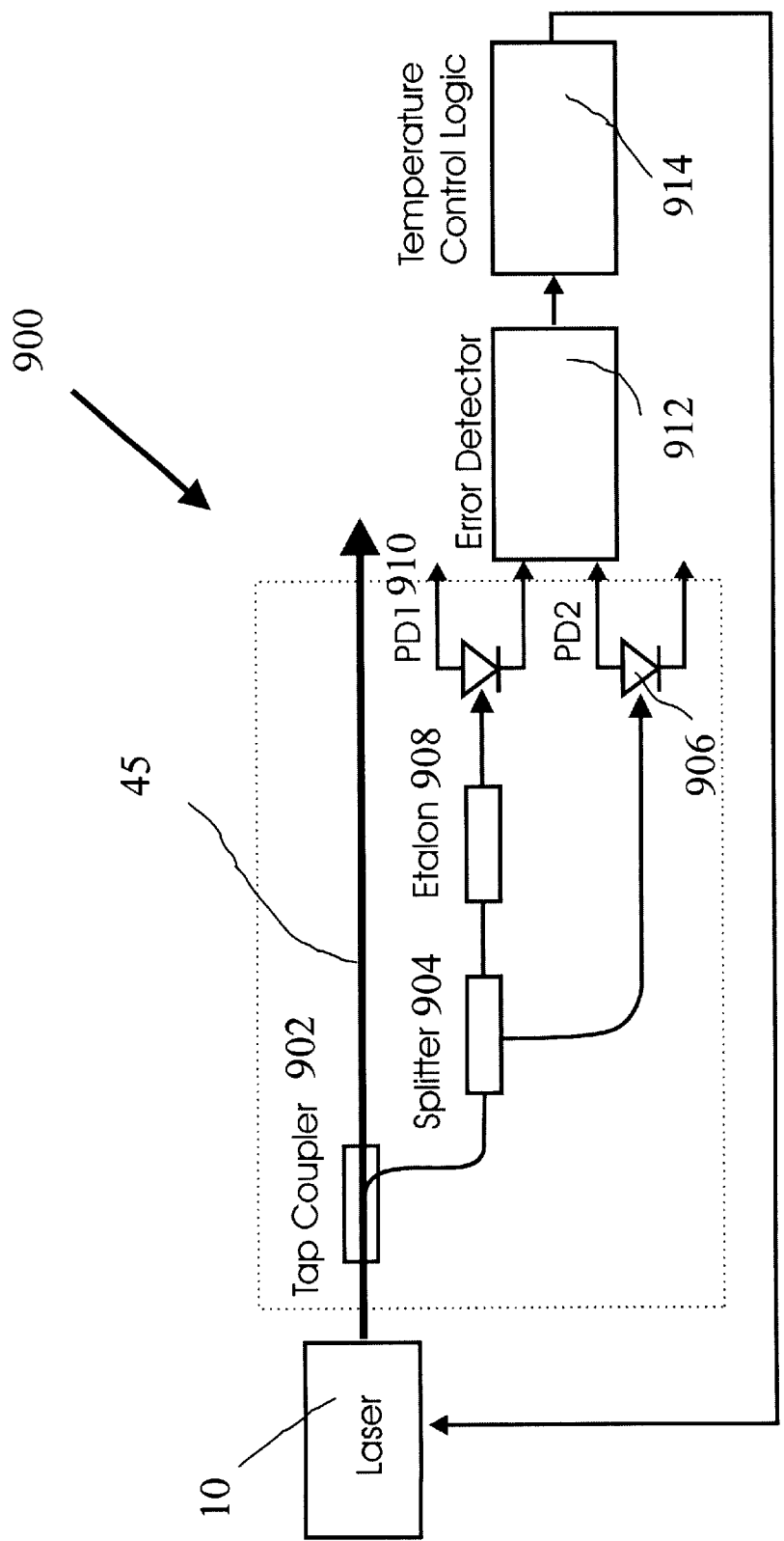
FIG. 9 is a block diagram illustrating an alternate embodiment of the tunable single-mode fiber laser incorporating a $\lambda$-locker.

As shown in FIG. 9, the tunable single-mode fiber laser 10 depicted in FIG. 1 is configured with a λ-locker 900. The λ-locker setup 900 incorporates a tap coupler 902 that taps a small portion of laser output beam 42 and a beam splitter 904 that splits the tapped signal into two channels. The first channel is detected by a photodiode detector 906. The second channel passes through a multi-λ reference element 908 and is detected by a photodiode detector 910. Traditional λ-locker control algorithms offset the discrete wavelengths from the transmission maxima to simplify the optimization algorithm and increase sensitivity. Because the locker is external to the cavity the additional loss is inconsequential. An error detector 912 compares the outputs of photodiodes 906 and 908 and passes the results to a temperature control logic circuit 914, which in turn sends a signal to controller 33, which adjusts thermal control element 14 as shown in FIG. 1 to stabilize the longitudinal mode structure as before. See for instance "Wavelength Lockers keep lasers in line", E. Miskovic, Photonics Spectra Febr. 1999, p. 104. Note, as discussed previously the multi-λ reference element can be used without the locker circuitry to simply establish the pattern of discrete wavelengths.

Figure 10:
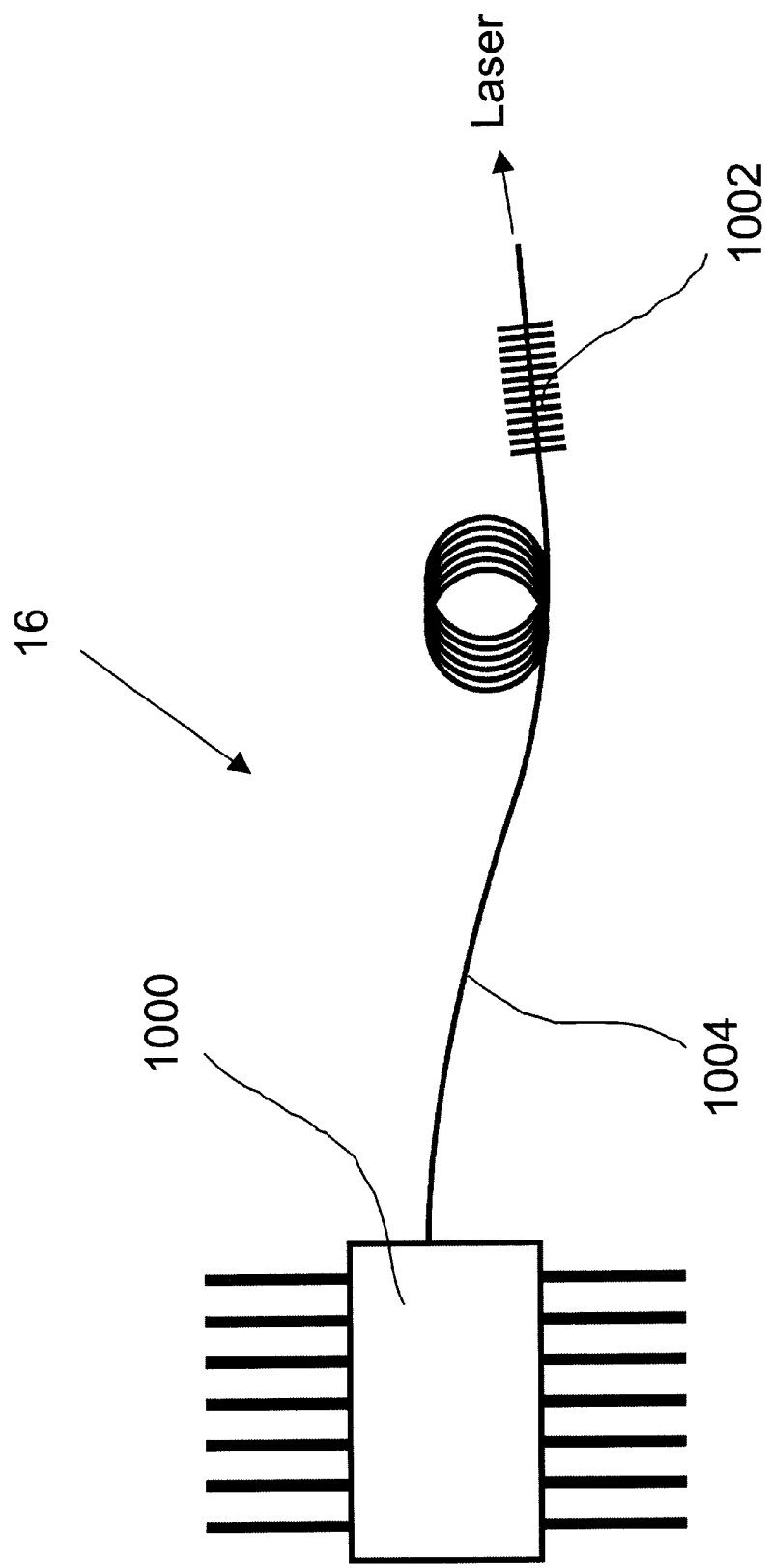
FIG. 10 is a diagram of a semiconductor pump laser using a section of polarization maintaining fiber.

As described above in connection with FIG. 1, the optical cavity must be pumped to induce lasing. As shown in FIG. 10, an off-the-shelf single-mode semiconductor pump diode 16 includes a semiconductor chip 1000 and a grating 1002 separated by about a meter of passive fiber 1004. The grating locks the pump's output to a wavelength of 976 nm. In most applications, the OTS pump diode is adequate. Since, however, very narrow linewidth lasers have a lot of application in sensing, in particular acoustic sensing, it is important to ensure very low frequency and phase noise at low frequencies. The phase noise is particularly sensitive to polarization fluctuations in the pump fiber. Single mode semiconductor pump lasers emit highly polarized light. The polarization of the pump light is, however, sensitive to polarization fluctuations in the pump fiber. The fiber 1004 that leads from the diode 1000 to the fiber laser is typically longer than 1 m and any vibration and acoustic pickup in this fiber leads to small changes in the pump light polarization. Due to the anisotropy of the active ions, this leads to additional noise in the fiber laser output. The effect is more pronounced in the phase noise as in the intensity noise. Ronnekleiv has already pointed out that this vibration and pressure sensitivity could be largely reduced if one would use a depolarized pump source. ["Frequency and Intensity Noise of Single Frequency Fiber Bragg Grating Lasers", by Erlend Ronnekleiv, Optical Fiber Technology, 7, 206–235 (2001)—page 227, second paragraph]. Placing a depolarizer between the highly-polarized pump laser and the fiber laser is one way to reduce the acoustic pickup in the lead fiber.

Using polarization maintaining (PM) fiber 1004 from the pump diode 1000 to the fiber laser avoids the costly depolarizer and has the same effect. Due to the birefringence in polarization maintaining fiber, the polarization state of the pump light will not change when the fiber is subject to mechanical vibrations or acoustic pressure waves. Experiments have shown that using PM fiber in the pump lead greatly reduces the phase noise of the fiber laser output and the sensitivity to low frequency external noise.

While several illustrative embodiments of the invention have been shown and described, numerous variations and alternate embodiments will occur to those skilled in the art. Such variations and alternate embodiments are contemplated, and can be made without departing from the spirit and scope of the invention as defined in the appended claims.

We claim:

1. A tunable fiber laser, comprising:
    a section of active fiber formed from a phosphate glass host having a core doped with erbium ions;
    a pump that illuminates the fiber to excite the erbium ions and provide gain;
    first and second broadband reflectors that define a laser cavity that includes the section of fiber, said cavity establishing an initial longitudinal mode structure with a longitudinal mode spacing of at least 0.3 GHz and a roundtrip unsaturated gain of at least 8 dB; and
    a tunable Fabry-Perot filter in said laser cavity having a filter function whose spectral width is at most ten times the longitudinal mode spacing to select a single longitudinal mode at which the erbium provides laser emission and having a free spectral range (FSR) of at least 35 nm.

2. The tunable fiber laser of claim 1, wherein spectral width of the filter function is at most four times the longitudinal mode spacing.

3. The tunable fiber laser of claim 1, wherein the longitudinal mode spacing is at least 0.5 GHz.

4. The tunable fiber laser of claim 1, wherein the section of active fiber is 2–25 cm in length and comprises:
    a cladding formed from a phosphate glass host; and
    a core formed from a similar phosphate glass host doped with 0.5–5.0 wt. % erbium ions.

5. The tunable fiber laser of claim 4, wherein the pump comprises a single-mode laser that illuminates the fiber core, said core being doped with 0.5–3.0 wt. % erbium ions and 0.5–15.0 wt. % ytterbium ions.

6. The tunable fiber laser of claim 5, wherein the single-mode laser comprises a length of polarization maintaining fiber.

7. The tunable fiber laser of claim 4, wherein the pump comprises a multi-mode laser that illuminates the fiber core, said core being doped with 0.5–3.0 wt. % erbium ions and 5–15.0 wt. % ytterbium ions.

8. The tunable fiber laser of claim 1, wherein the tunable Fabry-Perot filter comprises a first mirror and a second mirror configured to be displaced relative to said first mirror under an applied force, wherein said second mirror is suspended by a compliant material attached along a boundary of said second mirror.

9. The tunable fiber laser of claim 8, wherein the filter further comprises an actuator frame disposed proximate to said second mirror, wherein said actuator frame comprises a first driving electrode configured to electrically cooperate with at least one electrode on said second mirror to displace said second mirror by an electrostatic force.

10. The tunable fiber laser of claim 9, wherein the actuator frame further comprises at least one capacitance sense electrode configured to capacitively couple to at least one electrode on said second mirror.

11. The tunable fiber laser of claim 8, wherever said mirror is supported by a mirror support, and said compliant material has a Young's modulus that is smaller than the Young's modulus of the mirror support.

12. The tunable fiber laser of claim 8, wherein said first mirror is suspended by a compliant material attached along a boundary of said first mirror.

13. The tunable fiber laser of claim 12, wherein the first and second mirrors are adapted to exhibit substantially similar displacement when they are both subjected to a common external force.

14. The tunable fiber laser of claim 8, wherein the first mirror is fixed and the compliant material around the boundary of the second mirror is loaded substantially in shear when said second mirror is displaced.

15. The tunable fiber laser of claim 1, further comprising:
    a controller that tunes the filter to roughly align its transmission maxima to one of a plurality of discrete output wavelengths that span the C-band; and
    a thermal control element that adjusts the longitudinal mode structure to align a single longitudinal mode with the transmission maxima so that the erbium provides laser emission at that single longitudinal mode and said laser produces a single-mode output signal.

16. The tunable fiber laser of claim 15, further comprising:
    a λ-locker reference element that establishes a periodic filter function whose transmission maxima fix the respective discrete output wavelengths and locks the single-mode output signal to the desired discrete output wavelength.

17. The tunable fiber laser of claim 1, further comprising a package including a rigid substrate on which the laser is mounted to provide thermal isolation and compliant supports that connect the rigid substrate to the package to provide vibration isolation.

18. A tunable fiber laser, comprising:
a section of fiber 2–25 cm in length including,
a cladding formed from a phosphate glass host; and
a core formed from a similar phosphate glass host codoped with 0.5–3.0 wt. % erbium ions and at least 0.5 wt. % ytterbium ions;
a pump that illuminates the fiber to excite the erbium ions and provide gain;
first and second broadband reflectors that define a laser cavity that includes the section of fiber, said cavity establishing an initial longitudinal mode structure with a longitudinal mode spacing of at least 0.3 GHz; and
a free-space tunable Fabry-Perot filter in said laser cavity having a filter function whose spectral width is at most ten times the longitudinal mode spacing to select a single longitudinal mode at which the erbium provides laser emission.

19. The tunable fiber laser of claim 18, wherein the longitudinal mode spacing is at least 0.5 GHz and the spectral width of the filter function is at most four times the longitudinal mode spacing.

20. The tunable fiber laser of claim 19, wherein the tunable Fabry-Perot filter comprises a first mirror and a second mirror configured to be displaced relative to said first mirror under an applied force, wherein said second mirror is suspended by a compliant material attached along a boundary of said second mirror.

21. A tunable fiber laser, comprising:
a section of active fiber formed from a phosphate glass host having a core doped with erbium ions;
a pump that illuminates the fiber to excite the erbium ions and provide gain;
first and second broadband reflectors that define a laser cavity that includes the section of fiber, said cavity establishing an initial longitudinal mode structure with a longitudinal mode spacing of at least 0.3 GHz; and
a free-space tunable MEMS Fabry-Perot filter in said laser cavity having a filter function whose spectral width is at most ten times the longitudinal mode space to select a single longitudinal mode at which the erbium provides laser emission, said MEMS filter comprising a first mirror and a second mirror configured to be displaced relative to said first mirror under an applied force, wherein said second mirror is suspended by a compliant material attached along a boundary of said second mirror.

22. The tunable fiber laser of claim 21, wherein the longitudinal mode spacing is at least 0.5 GHz and the spectral width of the filter function is at most four times the longitudinal mode spacing.

23. The tunable fiber laser of claim 21, wherever said mirror is supported by a mirror support, and said compliant material has a Young's modulus that is smaller than the Young's modulus of the mirror support.

24. The tunable fiber laser of claim 21, wherein said first mirror is suspended by a compliant material attached along a boundary of said first mirror, said first and second mirrors being adapted to exhibit substantially similar displacement when they are both subjected to a common external force.

25. The tunable fiber laser of claim 21, wherein the first mirror is fixed and the compliant material around the boundary of the second mirror is loaded substantially in shear when said second mirror is displaced.

26. A tunable fiber laser, comprising:
a section of active fiber formed from a phosphate glass host having a core doped with erbium ions;
a pump that illuminates the fiber to excite the erbium ions and provide gain;
first and second broadband reflectors that define a laser cavity that includes the section of fiber, said cavity establishing an initial longitudinal mode structure with a longitudinal mode spacing of at least 0.3 GHz; and
a free-space tunable MEMS Fabry-Perot filter in said laser cavity having a filter function whose spectral width is at most ten times the longitudinal mode space;
a controller that tunes the filter to roughly align its transmission maxima to one of a plurality of discrete output wavelengths that span the C-band; and
a thermal control element that adjusts the longitudinal mode structure to align a single longitudinal mode with the transmission maxima so that the erbium provides laser emission at that single longitudinal mode and said laser produces a single-mode output signal.

27. The tunable fiber laser of claim 26, wherein the longitudinal mode spacing is at least 0.5 GHz and the spectral width of the filter function is at most four times the longitudinal mode spacing.

28. The tunable fiber laser of claim 26, further comprising:
a $\lambda$-locker reference element that establishes a periodic filter function whose transmission maxima fix the respective discrete output wavelengths and locks the single-mode output signal to the desired discrete output wavelength.

29. The tunable fiber laser of claim 26, further comprising a package including a rigid substrate on which the laser is mounted to provide thermal isolation and compliant supports that connect the rigid substrate to the package to provide vibration isolation.

30. A tunable fiber laser, comprising:
a section of fiber 2–15 cm in length including,
a cladding formed from a phosphate glass host; and
a core formed from a similar phosphate glass host codoped with 0.5–3.0 wt. % erbium ions and at least 0.5 wt. % ytterbium ions;
a pump that illuminates the fiber to excite the erbium ions and provide gain;
first and second broadband reflectors that define a laser cavity of 20 cm or less that includes the section of fiber, said cavity establishing an initial longitudinal mode structure that spans the C-band of 1530 nm to 1565 nm with a longitudinal mode spacing of at least 0.5 GHz and a roundtrip unsaturated gain of at least 8 dB;
a free-space tunable MEMS Fabry-Perot filter in said laser cavity having a filter function whose spectral width is at most four times the longitudinal mode space and having a free spectral range (FSR) of at least 35 nm said MEMS filter comprising a first mirror and a second mirror configured to be displaced relative to said first mirror under an applied force, wherein said second mirror is suspended by a compliant material attached along a boundary of said second mirror;
a multi-$\lambda$ reference element that establishes a periodic filter function whose transmission maxima fix a pattern of discrete output wavelengths;

a controller that tunes the filter to roughly align its transmission maxima to one of the plurality of discrete output wavelengths that span the C-band; and a thermal control element that adjusts the longitudinal mode structure to align a single longitudinal mode with the transmission maxima so that the erbium provides laser emission at that single longitudinal mode and said laser produces a single-mode output signal.

31. The tunable fiber laser of claim 30, further comprising:

a λ-locker that includes the multi-λ reference element and locks the single-mode output signal to the desired discrete output wavelength.

* * * * *